US011940217B2

(12) United States Patent
Bassan et al.

(10) Patent No.: US 11,940,217 B2
(45) Date of Patent: Mar. 26, 2024

(54) METHOD FOR MOULDING A SHEET INTO A COMPONENT OF COMPLEX SHAPE HAVING AREAS WITH DIFFERENT MECHANICAL PROPERTIES, PARTICULARLY A MOTOR-VEHICLE COMPONENT

(71) Applicant: C.R.F. Società Consortile per Azioni, Orbassano (IT)

(72) Inventors: Daniele Bassan, Orbassano (IT); Marco Colosseo, Orbassano (IT)

(73) Assignee: C.R.F. Societa Consortile Per Azioni, Orbassano (IT)

( * ) Notice: Subject to any disclaimer, the term of this patent is extended or adjusted under 35 U.S.C. 154(b) by 598 days.

(21) Appl. No.: 17/144,714

(22) Filed: Jan. 8, 2021

(65) Prior Publication Data

US 2021/0262732 A1 Aug. 26, 2021

(30) Foreign Application Priority Data

Feb. 21, 2020 (EP) .................................... 20158684

(51) Int. Cl.
*C21D 9/00* (2006.01)
*B21D 37/16* (2006.01)
(Continued)

(52) U.S. Cl.
CPC ............ *F27B 9/2407* (2013.01); *B21D 37/16* (2013.01); *C21D 8/0205* (2013.01); (Continued)

(58) Field of Classification Search
CPC ............... A21B 1/46; F27D 2003/0087; F27D 2003/0016; F27B 9/2407; F27B 9/16; (Continued)

(56) References Cited

U.S. PATENT DOCUMENTS 1,999,596 A * 4/1935 Roemer ................... C21D 9/46 198/612
2012/0264074 A1* 10/2012 Gockel ................... F27D 11/00 432/118

(Continued)

FOREIGN PATENT DOCUMENTS

CN 206692689 U 12/2017
DE 3219928 A * 12/1983 ............... B05C 9/14

(Continued)

OTHER PUBLICATIONS

European Search Report dated Aug. 25, 2020.

*Primary Examiner* — Gregory A Wilson
(74) *Attorney, Agent, or Firm* — Heslin Rothenberg Farley & Mesiti P.C.; Victor A. Cardona, Esq.

(57) ABSTRACT

A method for moulding a sheet into a component of complex shape having areas with different mechanical properties, particularly a motor-vehicle component, includes a first heating step of the sheet carried out by a kiln, prior to forming the component. The kiln has a main body with a roller shape, having a plurality of sectors extending along a radial direction with respect to a longitudinal axis of the roller body. The sectors are configured to each receive a sheet, so that the main body with a roller shape is arranged to simultaneously carry a plurality of sheets. The kiln includes a plurality of heating elements incorporated in the roller-shaped main body, so as to heat the sheets in contact with the roller body. The kiln includes at least one electronically-controlled drive motor, arranged to rotate the roller-shaped main body around the longitudinal axis of the kiln, so as to vary the position of the sectors with respect to the inlet and outlet ports. An additional heating step follows extraction of the sheets from the kiln, wherein the sheets are
(Continued)

Figure 1:
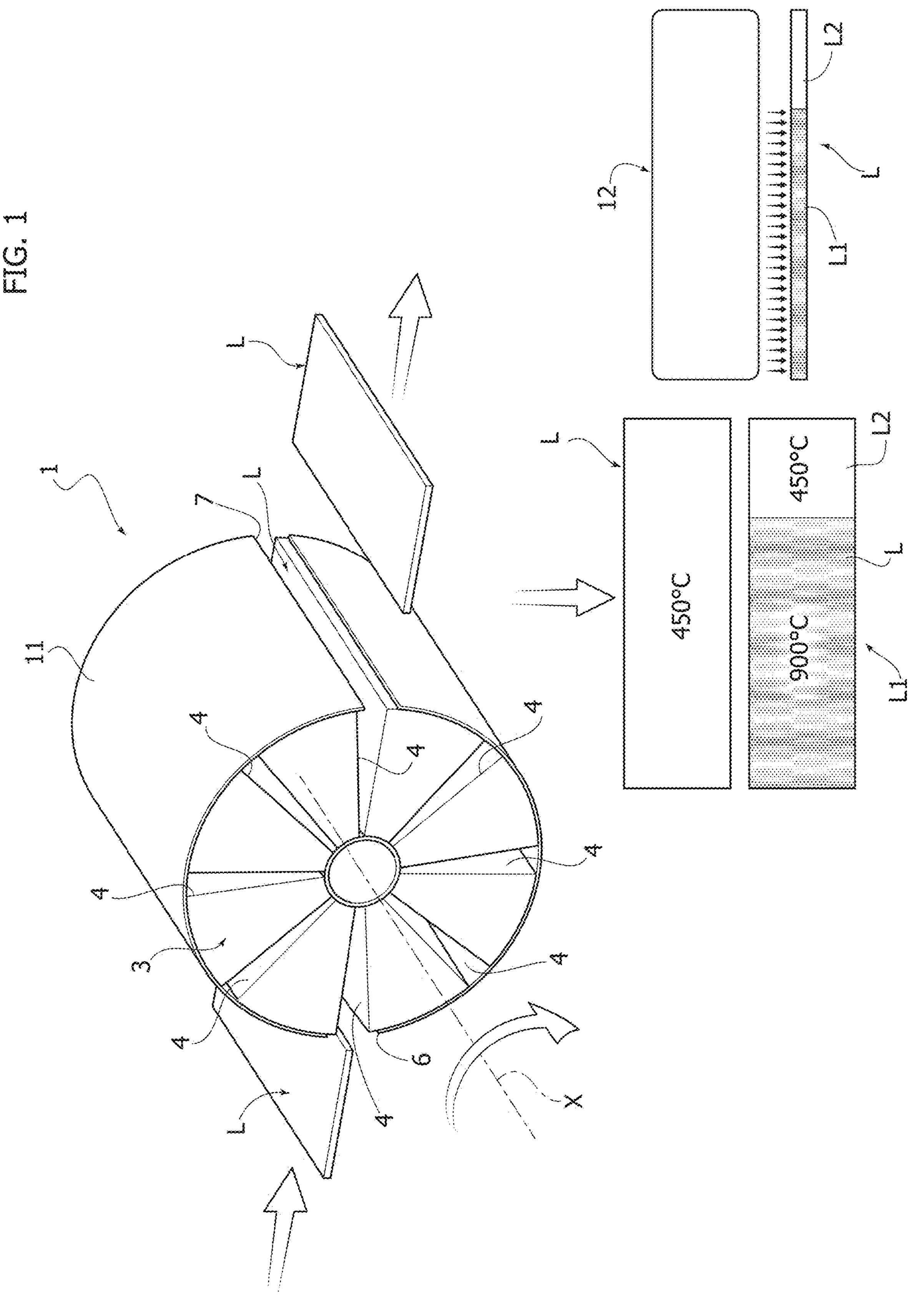

locally heated only at one area, so as to obtain sheets with areas heated to different temperatures.

11 Claims, 3 Drawing Sheets

(51) Int. Cl.

| | |
|---|---|
| ***C21D 8/02*** | (2006.01) |
| ***C21D 9/46*** | (2006.01) |
| ***F27B 9/24*** | (2006.01) |
| *B21D 53/88* | (2006.01) |

(52) U.S. Cl.
CPC ............. *C21D 9/0031* (2013.01); *C21D 9/46* (2013.01); *B21D 53/88* (2013.01); *C21D 2221/00* (2013.01)

(58) Field of Classification Search
CPC .... B21D 37/16; C21D 8/0205; C21D 9/0031; C21D 9/0037; C21D 9/46; C21D 8/02; C21D 8/0247
See application file for complete search history.

(56) References Cited

U.S. PATENT DOCUMENTS

| | | | | |
|---|---|---|---|---|
| 2014/0134555 | A1* | 5/2014 | Hebert .................. | F27D 1/0003 432/247 |
| 2019/0032162 | A1 | 1/2019 | Reinartz et al. | |

FOREIGN PATENT DOCUMENTS

| | | | |
|---|---|---|---|
| FR | 2037618 | A5 | 12/1970 |
| GB | 987084 | A | 3/1965 |
| WO | 2010127837 | A2 | 11/2010 |
| WO | 2010127837 | A3 | 11/2010 |

* cited by examiner

METHOD FOR MOULDING A SHEET INTO A COMPONENT OF COMPLEX SHAPE HAVING AREAS WITH DIFFERENT MECHANICAL PROPERTIES, PARTICULARLY A MOTOR-VEHICLE COMPONENT

CROSS REFERENCE TO RELATED APPLICATIONS

This application claims priority from European Patent Application No. 20158684.9 filed on Feb. 21, 2020, the entire disclosure of which is incorporated herein by reference.

FIELD OF THE INVENTION

The present invention relates to a method for moulding a sheet into a component of complex shape having areas with different mechanical properties, particularly a motor-vehicle component, such as, for example, the central upright ("upright B") of a motor-vehicle body.

The invention relates, in particular, to a method of the type in which heating steps of the aforesaid sheet are provided, preliminary to a forming step to make the final component.

PRIOR ART

To obtain a component of complex shape, made of metal material, characterized by local variations of its mechanical properties, the prior art is that of preparing a semi-finished sheet metal product made according to "tailored blank" technology.

To make a component of the type indicated above, other known technologies envisage subjecting the component to localized heat treatments. In this application context, a previously proposed technique is to prepare the moulds, in which the complex-shaped component is formed, with a series of cooling channels, configured to cool only a part of the mould, and therefore, only a part of the component obtained after moulding. One of the disadvantages of this production method is that of obtaining undesired deformations in certain areas of the component, following localized cooling.

Methods of the type indicated at the beginning of the description that envisage locally heating some regions of a sheet metal element, before the forming step, have also already been proposed in the past. One example of such a method is described in the document US2019/0032162 A1.

One of the technical problems encountered in methods of the type indicated above lies in the fact that the kiln lines set up to carry out the heating steps of the sheet, prior to forming the complex-shaped component, are rather bulky and not very efficient, both from the point of view of the energy expenditure required to operate the lines, and from the point of view of construction times, at the expense of the economy of production.

OBJECT OF THE INVENTION

The object of the present invention is to provide a method for moulding a sheet into a component of complex shape, particularly a motor-vehicle component having regions with different mechanical properties, which overcomes the drawbacks indicated above.

A further object of the present invention is to provide a method that is compatible with the needs of the automotive sector, that is, which guarantees in any case the possibility of obtaining components of complex shape starting from sheet metal with reduced thickness, with relatively low forming times and energy consumption and therefore compatible with the production rates of the automotive sector.

SUMMARY OF THE INVENTION

In order to achieve this object, the invention relates to a method of the type indicated at the beginning of the present description, wherein the following steps are envisaged:

- arranging at least one mould for forming the sheet configured to produce said motor-vehicle component;
- arranging at least one kiln to carry out a sheet-heating step, prior to forming said sheet, said kiln comprising:
  - a casing of refractory material having at least one inlet port and one outlet port arranged for inserting and extracting a sheet from said kiln, respectively,
  - a main body with a roller shape arranged inside said casing and having a plurality of sectors extending along a radial direction with respect to a longitudinal axis of the roller body, said sectors being configured to each receive a sheet, in such a way that said roller-shaped main body is designed to simultaneously carry a plurality of sheets,
  - a plurality of heating elements incorporated in said roller-shaped main body configured to heat said roller body, in such a way that the main body with a roller shape is arranged to heat said plurality of sheets, at their areas in contact with said roller body,
  - at least one electronically-controlled drive motor, arranged to rotate said roller-shaped main body around said longitudinal axis, so as to vary the position of the sectors with respect to the inlet and outlet ports;
- inserting a plurality of sheets within said sectors and uniformly heating the sheets to a predetermined temperature by means of said kiln,
- removing the heated sheets from the kiln,
- carrying out an additional heating step following extraction of the sheets from the kiln, wherein the sheets are locally heated only at one area, so as to obtain sheets with areas heated to different temperatures,
- subjecting the sheets to a forming step within said mould and uniformly cooling the locally-heated sheets, so as to obtain a component of complex shape having areas with different mechanical properties.

Preferably said additional heating step is carried out by means of a diode laser heating station.

Preferably, the kiln includes an actuator configured to push a sheet brought from one of the sectors towards said outlet port.

In the preferred embodiment, an electronic control unit is programmed to determine the heating cycle of the sheets and all its operating parameters, in particular to control the kiln, the heating elements, the drive motor and the actuator. The drive motor can be controlled to interrupt the rotation of the roller body, when a kiln-loading step is carried out, introducing a sheet through the inlet port, and when an unloading step is carried out, extracting a sheet from the kiln through the outlet port.

Studies and investigations carried out by the Applicant have shown that, thanks to these characteristics, the method of the invention allows the final complex shape of the sheet to be obtained using a sheet with relatively reduced thickness (with the advantage of the economy of production and the lightness of the finished component), without the production complications deriving from the known technologies previously indicated.

In this way, the method according to the invention allows components to be obtained in a single piece, with local variations of the mechanical properties, without the need to mount reinforcing elements on the formed component, in areas subject to higher stresses.

DESCRIPTION OF A PREFERRED EMBODIMENT OF THE INVENTION

Figure 2:
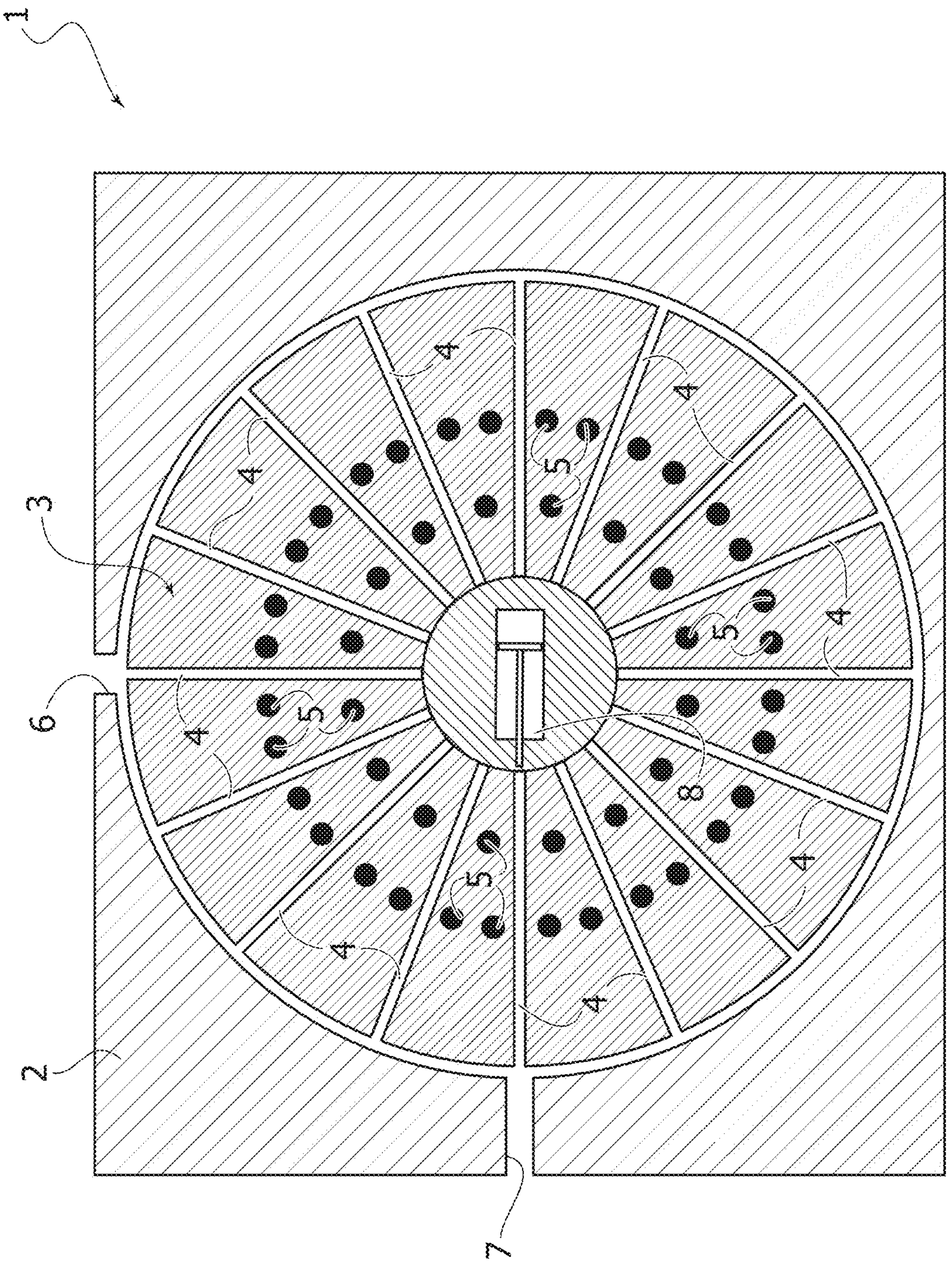
Figure 4:
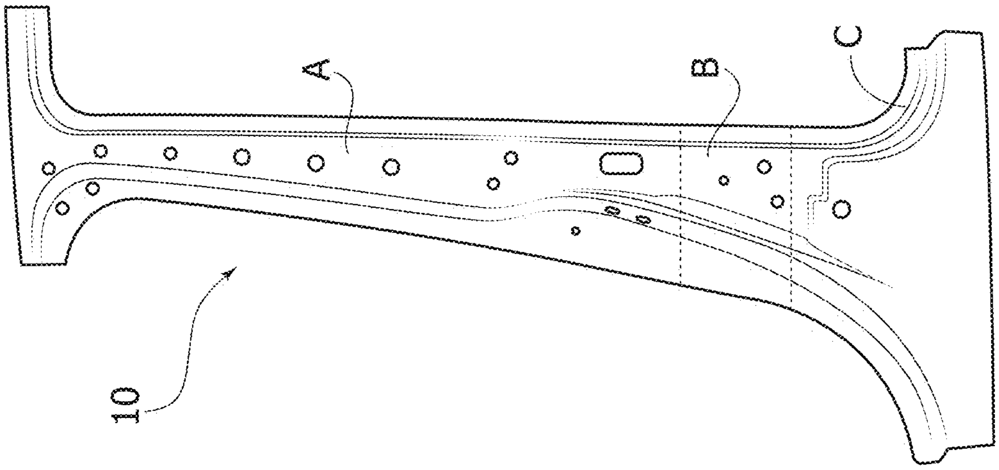
Figure 3:
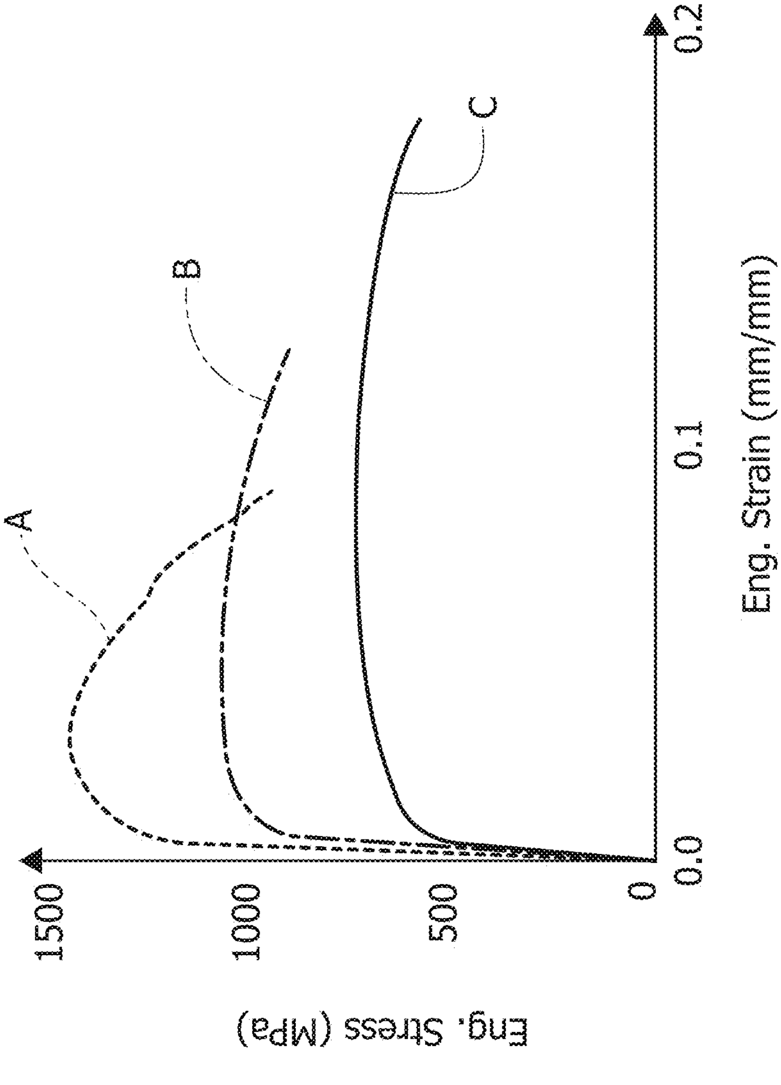

Further characteristics and advantages of the present invention will become apparent from the description that follows with reference to the attached drawings, provided purely by way of non-limiting example, wherein:

FIG. 1 illustrates some steps of the sheet-forming method according to the present invention, FIG. 2 is a cross-sectional view of some characteristics illustrated in the previous figure, FIG. 3 is a diagram illustrating some mechanical properties of a motor-vehicle component obtained following the method according to the present invention, and FIG. 4 is an example of a motor-vehicle component obtained following the method according to the present invention.

In the following description various specific details are illustrated aimed at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

FIGS. 1 and 2 illustrate, respectively, a perspective view and a cross-sectional view of embodiments of a kiln for implementing a step of the method according to the invention.

Above all, the method according to the invention is conceived to form a sheet in a component of complex shape, particularly a motor-vehicle component having areas with different mechanical properties. The method is applicable both to different types of metal materials (such as aluminium or magnesium alloys), and to different types of polymeric materials (such as thermoplastic materials). In order to make a component of complex shape, in accordance with the method according to the invention, it is necessary to carry out preliminary heating steps of the aforesaid sheet, in order to locally heat different areas of the sheet itself at different temperature values.

In the attached drawings, reference number 1 indicates overall a kiln for carrying out the first preliminary heating step, in accordance with the method according to the invention.

The kiln 1 includes a casing 2—illustrated in FIG. 2—of refractory material which has an inlet port 6 for inserting a sheet L into the kiln 1, and an outlet port 7, for extracting the sheet L from the kiln 1, once the heat treatment is completed. In accordance with the embodiment illustrated in FIG. 2, the inlet port 6 is formed along an upper side of the casing 2, so that the sheet L can be inserted into the kiln 1 in a vertical direction. Still with reference to the preferred embodiment illustrated in the drawings, the outlet port 7 is formed along a side wall of the casing 2, so that the sheet L can be extracted from the kiln 1 along a horizontal direction, perpendicular to the insertion direction.

In the case of the invention, the kiln 1 comprises a main body with a roller shape 3, arranged within the casing 2, which has a plurality of sectors 4 that extend along a radial direction with respect to a longitudinal axis X of the roller body 3. The sectors 4 are configured to each receive a respective sheet L, in such a way that the kiln 1 is configured to simultaneously carry a plurality of sheets L. In the embodiment illustrated in FIG. 1, the kiln casing is defined by a cylindrical wall 11 adjacent to the outer surface of the roller body 3, including an inlet port and an outlet port 6, 7 for the inlet/outlet of the sheets L.

According to the embodiment illustrated in FIG. 1, the sectors 4 are arranged with a constant pitch along the main roller-shaped body 3, spaced apart from each other at an angle of about 45°. Of course, this spacing of the sectors 4 can vary widely with respect to the aforesaid configuration, so as to reduce or increase the maximum number of sheets L carried by the kiln 1, and therefore, vary the overall capacity of the kiln 1 to simultaneously treat a certain number of sheets L. For example, as shown in the cross-sectional view of FIG. 2, the roller body 3 may have a greater number of sectors 4, compared to that illustrated in FIG. 1, in particular by presenting a multitude of sectors 4 spaced apart from each other by an angle of about 20°. As illustrated in the embodiment of FIG. 1, the sectors 4 can be tapered towards the inside of the roller body 3 so as to create a particularly effective configuration for supporting the sheets L.

As illustrated in the cross-sectional view of FIG. 2, a plurality of heating elements 5 are integrated inside the roller body 3, so as to heat the roller body 3 and, consequently, the sheets L arranged within the sectors 4. The heat treatment carried out on the sheets L arranged within the sectors 4 leads to obtaining a sheet L uniformly heated to a first temperature Ti. In a concrete embodiment, the temperature to which a metal sheet is brought is about 450° C., corresponding to a temperature close to, but less than the austenitizing temperature of the sheet L.

Preferably, the heating elements are electrical resistances incorporated within the portions of the roller body 3 defined by the sectors 4.

In view of a concrete implementation of the method according to the invention, the kiln 1 includes at least one electronically controlled drive motor, arranged to rotate the roller body 3 around its longitudinal axis X, so as to vary the position of the sectors 4 with respect to the inlet and outlet ports 6, 7. The rotation speed of the roller body 3 is variable depending on the heat treatment that is intended to be applied to the sheets L and on other operating parameters such as the energy developed by the heating elements 5. The rotation of the roller body 3 can be continuous or intermittent, depending on the logistics of the production plant. In any case, the drive motor is controlled to interrupt the rotation of the roller body 3, when a loading step of the kiln 1 is carried out, introducing a sheet L through the inlet port 6, and during an unloading step, extracting a sheet L from the kiln 1 through the outlet port 7. Depending on the required heat treatment, the energy emitted by the heating elements 5, the material of the sheets L and the rotation speed of the roller body 3, the sheets L can rotate integrally with the roller body 3, by less than a 360 degree turn angle (for example, by making a rotation of 270 degrees) or even for several full turns.

The figures of the attached drawings are schematic and do not illustrate the construction details of the drive motor, which can be made according to techniques known to those skilled in the art. Also not illustrated are the means for moving the sheets L to insert and extract the sheets from the kiln 1 through the ports 6, 7 and the means for supporting the roller body 3. In addition to the inner surface of the casing 2 (FIG. 2) and of the cylindrical wall 11 (FIG. 1), the kiln 1 can be equipped with mechanical containment members respectively associated with each sector 4, to support the sheets L within the sectors 4 and to prevent the sheets L accidentally leaving the sectors 4 during rotation of the roller body 3, before the heat treatment is completed. All the aforesaid aspects are also not illustrated in the drawings and can be made in any known way.

The kiln 1 can also include an actuator 8—schematically illustrated in FIG. 2—arranged to push the sheets L carried by the sectors 4 towards the outlet port 7, following completion of the heat treatment. The actuator 8 can be arranged within a central portion of the roller body 3, which includes the means for supporting the roller body 3 rotating around the axis X.

To automate the method according to the invention, the elements of the kiln 1, in particular the heating elements 5, the drive motor for rotating the roller body 3 and the actuator 8 are controlled by an electronic control unit, programmed to determine all the operating parameters of the heating cycle of the sheets L.

The kiln 1 having the above characteristics has a number of undoubted advantages. Firstly, the kiln is suitable for simultaneously heating a plurality of sheets L. Secondly, the kiln has a small footprint and high energy efficiency. Furthermore, the kiln is compatible with the needs of the automotive sector, guaranteeing relatively short cycle times and therefore compatible with the production rates of the automotive sector, and ensuring simple handling operations of the sheets L.

Following completion of the heat treatment by means of the kiln 1, the sheets L uniformly heated to a first temperature are extracted from the kiln 1 through the outlet port 7.

In accordance with a further characteristic of the method according to the invention, once extracted from the kiln 1, the sheets L are subjected to a second heating step, in which the sheets L are heated further. This second heating step is characterized by locally heating each sheet L, only at one area, so as to obtain a sheet area at a high temperature—indicated with the reference L1—and a sheet area at a lower temperature—indicated by the reference L2.

Preferably, this second heating step is carried out by means of a station which includes a heating system with diode lasers 12 (shown schematically in FIG. 1). Alternatively, this second heating step can be carried out with resistance or induction heating systems.

From the characteristics indicated above of the second heating step, it will therefore be appreciated that the high temperature area L1 corresponds to the sheet L portion directly heated by the system 12 and the lower temperature zone L2 corresponds to the sheet L portion not subject to heating by the system 12.

With reference to specific operating parameters, in the case of a steel sheet, the hot area L1 of the sheet L can, for example, reach an austenitizing temperature of about 900° C., while the lower temperature zone L2 ("cold" zone) remains below this austenitizing temperature (450° C.).

Preferably, the sheets L leaving the kiln 1 are arranged within the aforesaid heating station by means of automatic gripping and transporting members.

In one or more embodiments, instead of the aforesaid heating step, a temperature maintenance or stabilization step of the sheet L can be provided, in a particular area of the sheet.

In one or more embodiments, successively to the aforesaid heating step, a temperature maintenance or stabilization step of the sheet L can be provided, in a particular area of the sheet.

The system 12 can be controlled by the aforesaid electronic control unit which also controls the kiln 1 or by a second independent electronic control unit.

Once the sheet L with areas at different temperatures is obtained, the sheet L is arranged within a mould designed to form and obtain the required motor-vehicle component. Proceeding with the moulding step, it is possible to obtain a final component that has areas with different mechanical characteristics. Immediately after the forming step, in accordance with the method according to the invention, the sheets L are cooled uniformly, for example, by means of fluid cooling channels associated with the mould. The cooling and forming steps can be carried out according to any known technique, chosen by the skilled technician on the basis of the type of material constituting the sheet L and the final component to be made.

By way of example, FIG. 4 illustrates a motor-vehicle component 10, in particular a central upright of a motor vehicle body (upright B) made with the method according to the invention. FIG. 3 is a stress and deformation diagram of the aforesaid component 10. The references A, B, C indicate different areas of the component 10, obtained with the method according to the invention, which have different stress/deformation diagrams. More specifically, the area A corresponding to the sheet portion at high temperature (area L1) is characterized by a high resistance, while the areas B, C, corresponding to sheet L portions at progressively lower temperature are characterized by greater ductility. In all the above described embodiments, the method according to the invention is particularly suitable for forming various motor-vehicle components characterized by a local variation of the mechanical properties, so as to satisfy design requirements deriving from structural requirements that the components must comply with.

Of course, without prejudice to the principle of the invention, the details of construction and the embodiments may vary widely with respect to those described and illustrated purely by way of example, without departing from the scope of the present invention.

What is claimed is:

1. A method for molding a sheet into a component of complex shape having areas with different mechanical properties, the method comprising:

arranging at least one mold for forming the sheet configured to produce said component;

arranging at least one kiln to carry out a heating step of the sheet, prior to forming said sheet, said kiln comprising:

a casing of refractory material having at least one inlet port and one outlet port arranged for inserting and extracting a sheet from said kiln, respectively, a main body with a roller shape arranged inside said casing and having a plurality of sectors extending along a radial direction with respect to a longitudinal axis of the roller body, said sectors being configured to each receive a sheet, in such a way that said roller-shaped main body is designed to simultaneously carry a plurality of sheets, a plurality of heating elements incorporated in said roller-shaped main body so as to heat said roller body, in such a way that the roller-shaped main body is arranged to heat said plurality of sheets, at areas of said plurality of sheets in contact with said roller body, at least one electronically-controlled drive motor, arranged to rotate said roller-shaped main body around said longitudinal axis, so as to vary the position of the sectors with respect to the inlet and outlet ports;

inserting a plurality of sheets within said sectors and uniformly heating the sheets to a predetermined temperature by means of said kiln, removing the thus heated sheets from the kiln, carrying out an additional heating step following extraction of the sheets from the kiln, wherein the sheets are locally heated only at one area, so as to obtain sheets with areas heated to different temperatures, subjecting the sheets to a forming step within said mold and uniformly cooling the locally-heated sheets, so as to obtain a component of complex shape having areas with different mechanical properties.

2. A method according to claim 1, wherein said additional heating step is carried out by means of a heating station with diode lasers.

3. A method according to claim 2, wherein an electronic control unit is associated with said kiln, programmed to determine the heating cycle of the sheets and all operating parameters of said kiln, by controlling the kiln, the heating elements, the drive motor and the actuator.

4. A method according to claim 3, wherein the drive motor is controlled to interrupt the rotation of the roller body, when a loading step of the kiln is carried out, introducing a sheet through the inlet port, and during an unloading step, extracting a sheet from the kiln through the outlet port.

5. A method according to claim 1, wherein kiln includes an actuator configured to push a sheet carried by one of the sectors towards said outlet port.

6. A method according to claim 1, wherein said kiln includes mechanical containment members respectively associated with each sector, to support the sheets within the sectors and to prevent the sheets accidentally leaving the sectors during rotation of the roller body, before the heat treatment is completed.

7. A method according to claim 1, wherein the inlet port is formed along an upper side of the casing, so that the sheet can be inserted into the kiln along a vertical direction, and the exit port is made along a side wall of the casing, so that the sheet can be extracted from the kiln in a horizontal direction, perpendicular to the direction of insertion.

8. A method according to claim 1, wherein the sectors are arranged with a constant pitch along the roller-shaped main body, spaced from each other at an angle of about 45 degrees.

9. A method according to claim 1, wherein said plurality of sheets comprises a steel sheet, and wherein following said additional heating step following extraction of the sheets from the kiln, a steel sheet has a hot area having a temperature of about 900° C., and an area at a lower temperature that reaches a temperature of about 450° C.

10. The method of claim 1, wherein the component comprises a motor-vehicle component.

11. The method of claim 10, wherein the motor-vehicle component comprises a central upright of a motor-vehicle body.

* * * * *